(12) United States Patent
Hughes

(10) Patent No.: US 7,582,444 B2
(45) Date of Patent: *Sep. 1, 2009

(54) USE OF FLOCCULATING AGENTS FOR SEPARATING THE SOLID RESIDUE IN HYDROLYSED FERMENTATION SUBSTRATES

(75) Inventor: Jonathan Hughes, Huddersfield (GB)

(73) Assignee: Ciba Specialty Chemicals Water Treatments Ltd., Bradford (GB)

( * ) Notice: Subject to any disclaimer, the term of this patent is extended or adjusted under 35 U.S.C. 154(b) by 662 days.

This patent is subject to a terminal disclaimer.

(21) Appl. No.: 10/523,229

(22) PCT Filed: Jul. 28, 2003

(86) PCT No.: PCT/EP03/08296

§ 371 (c)(1),
(2), (4) Date: Jan. 31, 2005

(87) PCT Pub. No.: WO2004/015120

PCT Pub. Date: Feb. 19, 2004

(65) Prior Publication Data

US 2005/0271770 A1 Dec. 8, 2005

(30) Foreign Application Priority Data

Aug. 5, 2002 (GB) ................................. 0218010.7

(51) Int. Cl.
*C12P 1/00* (2006.01)
*C12P 13/20* (2006.01)
(52) U.S. Cl. ................... 435/41; 127/55; 127/56; 210/609; 210/702; 210/710; 210/714; 210/725; 210/728; 426/49; 426/495; 435/106; 435/109; 435/139; 435/140; 435/141; 435/144; 435/145; 435/150; 435/159; 435/160; 435/163

(58) Field of Classification Search ................. 210/728; 435/163
See application file for complete search history.

(56) References Cited

U.S. PATENT DOCUMENTS 3,711,462 A * 1/1973 Abdo ........................ 536/123

(Continued)

FOREIGN PATENT DOCUMENTS

EP 0102759 3/1984

(Continued)

OTHER PUBLICATIONS

Y. Kholkin et al., Applied Biochemistry and Biotechnology, vol. 82, No. 2, Nov. 1999, pp. 135-140.

(Continued)

*Primary Examiner*—Peter A Hruskoci
(74) *Attorney, Agent, or Firm*—Shiela A. Loggins

(57) ABSTRACT

Process for improving the separation efficiency of residual solid matter from the liquid phase of an aqueous acid hydrolysate of a naturally occurring polysaccharide comprising dissolved sugars, and residual acid wherein a flocculating agent(s) is added to the aqueous mixture in an effective amount, and a process of producing fermentation products comprising the steps of, (i) hydrolysing a particulate polysaccharide based plant derived material in an acid medium, and thereby forming an aqueous mixture comprising dissolved sugar and solid matter, (ii) subjecting the aqueous mixture to one or more separation stages in which solid matter are removed from the aqueous phase, (iii) adjusting the pH of the obtained aqueous phase to a pH of at least 4, (iv) fermenting the dissolved sugars of the aqueous phase by a microorganism to produce a fermentation product, (v) isolating the fermentation product, wherein in at least one separation stage in step (ii) a flocculating agent is added to the aqueous mixture in an effective amount.

10 Claims, 3 Drawing Sheets

U.S. PATENT DOCUMENTS

| | | | | |
|---|---|---|---|---|
| 3,972,775 | A | * 8/1976 | Wilke et al. | 435/99 |
| 4,384,897 | A | 5/1983 | Brink | 127/37 |
| 4,650,689 | A | 3/1987 | Hedrick | 426/600 |
| 5,529,699 | A | 6/1996 | Kuo et al. | 210/735 |
| 5,536,325 | A | * 7/1996 | Brink | 127/43 |
| 5,975,439 | A | 11/1999 | Chieffalo et al. | 241/17 |
| 6,068,869 | A | 5/2000 | Bent Ginslov | 426/262 |
| 6,071,417 | A | * 6/2000 | Adachi | 210/723 |
| 6,090,595 | A | * 7/2000 | Foody et al. | 435/99 |
| 6,130,303 | A | * 10/2000 | Neff et al. | 526/306 |
| 6,132,625 | A | * 10/2000 | Moffett | 210/727 |
| 6,967,085 | B1 | * 11/2005 | Hughes et al. | 435/99 |
| 7,244,596 | B2 | * 7/2007 | Baets et al. | 435/135 |
| 7,455,997 | B2 | * 11/2008 | Hughes | 435/109 |
| 2005/0079270 | A1 | * 4/2005 | Scheimann | 426/623 |

FOREIGN PATENT DOCUMENTS

| | | |
|---|---|---|
| EP | 0150933 | 8/1985 |
| EP | 0202780 | 11/1986 |
| JP | 61204100 | 9/1986 |
| WO | 98/58072 | 12/1998 |

OTHER PUBLICATIONS

C. Rivard et al., Applied Biochemistry and Biotechnology, vol. 57-58, No. 0, (1996), pp. 183-191.
Derwent Abstr. 1993-115187 for SU 1726519 (1992).
Derwent Abstr. 1990-183837 for SU 1527254 (1989).
J. Hughes et al., 20(ATV-DVWK-Bundestagung 2000), pp. 975-987.
Derwent Abstract 1986-281090 [43] for JP 61204100 (1986).
Derwent Abstr. 1997-344454 [32] for HU 70453 (1995).
Derwent Abstr. 1997-488205[45] for RU 2077594 (1997).
Chem. Abstr. 1985:185565 for Y. Huang, Makromol Chemie, vol. 186, No. 2, (1985), pp. 273-281.
Derwent Abstr. 1987-305414 [43] for SU 1300032 (1987).

* cited by examiner

USE OF FLOCCULATING AGENTS FOR SEPARATING THE SOLID RESIDUE IN HYDROLYSED FERMENTATION SUBSTRATES

The present invention relates to processes of treating plant derived material to provide an aqueous liquor containing sugars, which are used in a fermentation process to produce a fermentation product. Typically such fermentation products include for instance ethanol, glycerol, acetone, n-butanol, butanediol, isopropanol, butyric acid, methane, citric acid, fumaric acid, lactic acid, propionic acid, succinic acid, itaconic acid, acetic acid, acetaldehyde, 3-hydroxy propionic acid, glyconic acid and tartaric acid and amino acids such as L-glutaric acid, L-lysine, L-aspartic acid, L-tryptophan, L-arylglycines or salts of any of these acids.

It is known to treat shredded cellulosic material using concentrated acid to provide aqueous solutions of sugars, which can be used in a fermentation process. For instance U.S. Pat. No. 4,650,689 discloses a process of preparing ethanol from cellulosic material by subjecting the cellulosic material to highly concentrated mineral acid gas such as HCl under pressure, and treatment with hot water to give a liquor containing sugars which can be fermented.

U.S. Pat. No. 5,975,439 describes an automated process for producing ethanol by shredding the cellulosic component of municipal solid waste and mixing this with equal amounts of concentrated sulphuric acid at high temperature to provide a digested mixture. The aqueous sugar solution is separated from the solids by a filtration process before being subjected to a fermentation process.

However, it would be desirable to be able to increase the productivity of these manufacturing processes, especially for very cost sensitive products such as ethanol. In particular, it would be desirable to improve the drainage rate of acid treated plant derived material in order to maximize the soluble sugars recovered in the liquor. Further, the separated solids should be as dry as possible in order to prevent any loss of sugar, which would otherwise be used in the fermentation process. In addition, the solid by product, which contains mainly lignin can be used as a solid fuel, for instance for use in the boiler used to heat the distillation column which is used in separating the fermentation product from the fermentation broth. Thus, it is also desirable that if the solid lignin-containing product is used as a fuel, it should be as dry as possible. In addition, during separation of the solid matter from the aqueous phase, it is preferred to wash the solid matter with water, thus producing wash water. However, this wash water may contain impurities, e.g. if process liquors are recycled, which could be harmful to the fermentation process. Therefore, it would be desirable to minimise the amount of wash water used.

Accordingly, a process has been found, which improves the separation of solid matter from the liquid phase of an aqueous mixture comprising dissolved sugars, wherein a flocculating agent is added to the aqueous mixture in an effective amount, and which avoids the abovementioned disadvantages.

Preferably, this inventive process is part of a larger process, which yields a fermentation product such as the abovementioned alcohols, acids etc. Hence, usually the aqueous mixture comprising dissolved sugars and solid matter can be obtained by hydrolysing polysaccharide based plant derived material. Such a process is described in further detail below. As the hydrolysis preferably is carried out under acidic conditions, the aqueous mixture usually contains the acid applied for the hydrolysis of the polysaccharide based plant derived material.

Sugar in this context is taken to mean any monosaccharide or oligosaccharide or degradation product thereof which is capable of being consumed as a carbon source by fermenting microorganisms. Typically monosaccharides are ketonic (ketose) or aldehydic (aldose) derivatives of a poly-alcohol having the general structure $C_nH_{2n}O_n$ with n from 2 to 6 disaccharides such as cellobiose, maltose and sucrose may be suitable substrates but these are particularly preferred: glycoaldehyde, glyceraldehyde, dihydeoxyacetone, erythrose, threose, glucose, fructose, maltose, arabinose, ribose, xylose, mannose, galactose, allose, gulose, altrose, idose, talose, ribulose, erythrulose, xylulose, psicose, sorbose and tagatose, lyxose, ribose, arabinose, ribose, arabinose, allose, mannose, alitrose, xylose, lyxose, gulose, idoose, glactose, talose, gulose, galactose, erythro-pentulose, threo-pentulose, psicose, sorbose, tagatose, psicose, Solid matter means particulates and fibres which remain undissolved under the given hydrolysis conditions and generally comprise residues of starch, cellulose, galactomanan, hemicellulose, chitin, pectins, arabinogalactans, as well as non carbohydrates such as lignin and analogous resinous materials.

Suitably the flocculating agent is selected from the group consisting of water-soluble or water-swellable natural, semi-natural and synthetic polymers and charged microparticulate materials.

In a preferred embodiment of this invention, the flocculating agent would be added as an aqueous solution or aqueous dispersion. The flocculating agent is added in an amount sufficient to effect flocculation.

Typically the amount of polymeric flocculating agent sufficient to induce flocculation would be from 0.002 to 1, preferably from 0.01 to 1, and more preferably from 0.02 to 0.2% by weight, based on the weight of the solid matter.

Therefore, preferably the amount of flocculating agent is chosen in the range of from 0.002 to 1% by weight, based on the weight of solid matter.

Following flocculation of the suspended solids the solid product can be separated from the hydrolysate aqueous liquor by mechanical means, for instance filter press, centrifuge, belt press, horizontal belt filter or pressure filter.

Preferably the polymer is synthetic and may be formed by polymerisation of at least one cationic, non-ionic or and/or anionic monomer(s) alone or with other water-soluble monomers. By water-soluble we mean that the monomer has a solubility of at least 5 g/100 ml at 25° C.

Preferably polymeric flocculating agents are formed from ethylenically unsaturated water-soluble monomers that readily polymerise to produce high molecular weight polymers. Particularly preferred polymers are e.g. polyacrylate salts, polyacrylamide, copolymers derived from acrylamide and (meth)acrylic acid or salts thereof, copolymers derived from acrylamide and dialkylaminoalkyl (meth)acrylate acid salt or quaternary ammonium salts, polymers derived from diallyldimethyl ammonium chloride, polyamines and polyethylene imines. The polymers may be linear, branched or cross-linked.

The polymers may be prepared by any convenient process, for instance by solution polymerisation, gel polymerisation, reverse phase suspension polymerisation and reverse phase emulsion polymerisation. Suitable processes include those described in EP-A-150933 or EP-A-102759.

Suitable polymers can be anionic, cationic or non-ionic, preferably non-ionic or cationic. The intrinsic viscosity preferably is not less than 4 dl/g. Such an intrinsic viscosity generally indicates a polymer having a molecular weight of several million g/mol, for instance generally greater than 5,000,000 g/mol and usually at least 7,000,000 g/mol.

In general the polymer preferably has an intrinsic viscosity greater than 6 dl/g, often at least 8, particularly more than 9 dl/g. The intrinsic viscosity can be as high as 30 dl/g or higher. In many cases though suitable cationic polymers exhibit an intrinsic viscosity in the range of 7 to 25 dl/g, in particular 10 to 20 dl/g, in particular around 14 to 15 dl/g.

Suitable cationic monomers include quaternary ammonium or acid salts of monomers, which contain amine groups. Preferably the cationic polymer is formed from a monomer or blend of monomers comprising at least one cationic monomer selected from the group consisting of quaternary ammonium and acid salts of dimethylaminoethyl (meth) acrylate, quaternary ammonium and acid salts of dimethylaminoethyl (meth) acrylamide and diallyldimethyl ammonium chloride.

The cationic monomers may be homopolymerised or copolymerised with other monomers, for instance acrylamide. The cationic polymers thus may be any polymer that carries a cationic charge, provided of course that they are of sufficiently high molecular weight to exhibit an intrinsic viscosity of at least 4 dl/g.

In general, intrinsic viscosity is measured using a suspended level viscometer in 1M NaCl buffered to pH 7.5 at 25° C.

The cationic polymers according to the invention may be prepared as substantially linear polymers or as branched or structured polymers. Structured or branched polymers are usually prepared by inclusion of polyethylenically unsaturated monomers, such as methylene-bis-acrylamide into the monomer mix, for instance as given in EP-B-202780. Preferably however, the polymers are substantially linear. In addition, it is preferred to choose the polymers in the form of a bead or powdered product.

In a further preferred embodiment of the present invention the flocculating agent is a charged microparticulate material. Particularly suitable examples of charged microparticulate materials include swellable clays, anionic, cationic or amphoteric microparticulate silica based materials and organic cross-linked polymeric microparticles.

The siliceous material may be any of the materials selected from the group consisting of silica based particles, silica microgels, colloidal silica, silica sols, silica gels, polysilicates, aluminosilicates, polyaluminosilicates, borosilicates, polyborosilicates, zeolites or swellable clay.

This siliceous material may be in the form of an anionic microparticulate material. Alternatively the siliceous material may be a cationic silica. Desirably the siliceous material may be selected from silicas and polysilicates.

The polysilicates of the invention may be prepared by acidifying an aqueous solution of an alkali metal silicate. For instance polysilicic microgels otherwise known as active silica may be prepared by reducing the pH of an alkali metal silicate to between pH 2 and 10 by use of mineral acids or acid exchange resins, acid salts and acid gases. It may be desired to age the freshly formed polysilicic acid in order to allow sufficient three-dimensional network structure to form. Generally the time of ageing is insufficient for the polysilicic acid to gel. Particularly preferred siliceous materials include polyalumino-silicates. The polyaluminosilicates may be for instance aluminated polysilicic acid, made by first forming polysilicic acid microparticles and then post treating with aluminium salts.

Alternatively the polyaluminosilicates may be polyparticulate polysicilic microgels of surface area in excess of 1000 $m^2/g$ formed by reacting an alkali metal silicate with acid and water-soluble aluminium salts. Typically the polyaluminosilicates may have a mole ratio of alumina:silica in the range of 1:10 to 1:1500.

Polyaluminosilicates may be formed by reducing the pH of an aqueous solution of alkali metal silicate to between pH 2 and 10 using concentrated sulphuric acid containing 0.2 to 2.0% by weight of a water soluble aluminium salt, for instance aluminium sulphate. The aqueous solution may be aged sufficiently for the three dimensional microgel to form. Typically the polyaluminosilicate is aged for up to about two and a half hours before diluting the aqueous polysilicate to 0.5 weight % of silica.

The siliceous material may be a colloidal borosilicate. The colloidal borosilicate may be prepared by contacting a dilute aqueous solution of an alkali metal silicate with a cation exchange resin to produce a silicic acid and then forming a heel by mixing together a dilute aqueous solution of an alkali metal borate with an alkali metal hydroxide to form an aqueous solution containing 0.01 to 30% $B_2O_3$, having a pH of from 7 to 10.5.

The swellable clays may for instance be typically a bentonite type clay. The preferred clays are swellable in water and include clays which are naturally water swellable or clays which can be modified, for instance by ion exchange to render them water swellable. Suitable water swellable clays include but are not limited to bentonite or related swelling clays often referred to as hectorite, smectites, montmorillonites, nontronites, saponite, sauconite, hormites, attapulgites and sepiolites.

Most preferably the clay is a bentonite type clay. The bentonite may be provided as an alkali metal bentonite. Bentonites occur naturally either as alkaline bentonites, such as sodium bentonite or as the alkaline earth metal salt, usually the calcium or magnesium salt. Generally the alkaline earth metal bentonites are activated by treatment with sodium carbonate or sodium bicarbonate. Activated swellable bentonite clay is often supplied as dry powder. Alternatively the bentonite may be provided as a high solids flowable slurry, for example at least 15 or 20% solids.

When the charged microparticulate material comprises an organic cross-linked polymeric microparticles. The microparticles may be made as microemulsions by a process employing an aqueous solution comprising a cationic or anionic monomer and crosslinking agent; an oil comprising a saturated hydrocarbon; and an effective amount of a surfactant sufficient to produce particles of less than about 0.75 micron in unswollen number average particle size diameter. Microbeads are also made as microgels by procedures described by Ying Huang et. al., Makromol. Chem. 186, 273-281 (1985) or may be obtained commercially as microlatices. The term "microparticle", as used herein, is meant to include all of these configurations, i.e. beads per se, microgels and microlatices. The charged microparticle material may be used in amounts of at least 0.002% based on weight of suspended solids. Typically though the doses are usually as high as 0.8 or 1.0% or higher. When the charged microparticle material is inorganic, the dose is usually in excess of 0.06%, preferably in the range 0.1 to 0.6%. When the charged microparticle is organic, the dose is typically below 0.3%, preferably in the range 0.02 to 0.1%.

In another preferred embodiment, the solid matter can be separated particularly rapidly from the liquid phase, when the flocculation is effected by employing a water-soluble or water-swellable polymer and a charged microparticulate material.

In one aspect, it is particularly preferred when flocculation is effected by introducing an anionic microparticulate material into the aqueous mixture and then reflocculating by adding a cationic or substantially non-ionic polymer.

In a further preferred embodiment of the present invention flocculation is effected by introducing a cationic polymer into the aqueous mixture and then reflocculating by adding an anionic microparticulate material.

In a further preferred embodiment of the present invention flocculation is effected by introducing an anionic polymer into the aqueous mixture and then reflocculating by adding a cationic polymer.

In a further preferred embodiment of the present invention flocculation is effected by introducing a cationic polymer into the aqueous mixture and then reflocculating by adding an anionic polymer.

In a preferred embodiment of this invention, the aqueous mixture is obtained from hydrolysis of a polysaccharide based plant derived material.

Another embodiment of the present invention relates to a process of producing A fermentation product, which comprises the steps of,
(i) hydrolysing a particulate polysaccharide based plant derived material in an acid medium, and thereby forming an aqueous mixture comprising dissolved sugars and solid matter,
(ii) subjecting the aqueous mixture to one or more separation stages in which solid matter is removed from the aqueous phase,
(iii) adjusting the pH of the obtained aqueous phase to a pH of at least 4,
(iv) fermenting the dissolved sugars of the aqueous phase by a a microorganism to produce a fermentation product,
(v) isolating the fermentation product,
wherein in at least one separation stage in step (ii) a flocculating agent is added to the aqueous mixture in an effective amount.

Preferably the flocculating agent is selected from the group consisting of water-soluble polymers, water swellable polymers and charged microparticulate material.

The particulate polysaccharide based plant derived material usually is any readily available source of polysaccharides, particularly cellulosic materials. Typically the cellulosic material comprises materials selected from the group consisting of herbaceous biomass, softwood biomass, hardwood biomass, sewage sludge, paper mill sludge and the biomass fraction of municipal solid waste. The herbaceous biomass may for instance be bagasse, rice straw, rice hulls, corn stover, wheat straw, grass, trees and cotton gin trash.

By concentrated we mean that the acid generally has a concentration of at least 10% by weight. Usually though the concentration will be much higher depending on the chosen acid, for instance at least 15 or 20%, but may be considerably higher, for instance between 25 to 90% or even higher, for instance around 70 to 77% if sulphuric acid is chosen, or around 36 to 37% if hydrochloric acid is chosen. The acid may be a strong mineral acid such as hydrochloric acid, sulphuric acid, sulphurous acid, hydrofluoric acid, nitric acid or phosphoric acid. Suitable organic acids may be carbonic acid, tartaric acid, citric acid, glucuronic acid, gluconic acid, formic acid, trichloroacetic acid or similar mono- or polycarboxylic acids. The concentrated acid is ideally a strong acid. Ideally the acid exhibits a pKa below 4. Best results are obtained by using either hydrochloric acid or sulphuric acid.

The action of the concentrated acid on the plant derived material results in hydrolysis of the polysaccharides, e.g. hemicellulose, which releases $C_5$ and $C_6$ sugars leaving intact refractory substrates such as chitin and various non-carbohydrate solid by-product materials, mainly lignin. When the sugar liquor is used to produce a fermentation product, it is important that the aqueous sugars are effectively separated from the lignin and other by-products that would be potentially harmfully to the fermentation process. The action of the acid may also result in so-called decrystallisation and release of heavy metals that may be present in for example municipal solid waste.

Desirably the action of the strong acid is carried out at an elevated temperature. Ideally the temperature can be slightly above room temperature, for example 30° C. Usually though effective digestion of the plant derived material is carried out at higher temperatures, preferably between 50 to 100° C. The material will normally be subjected to acid treatment for at least 30 minutes. Usually the treatment will be much longer, for instance up to 600 or 700 minutes. The period of time required for adequate digestion may vary according to the particular plant derived material used, the strength of the acid and the temperature used. Normally the treatment will be between 40 and 480 minutes. Typically the hydrolysis would be performed at atmospheric pressure.

The liquid hydrolysate is then separated from the solid materials, preferably through pressing of the treated material to separate the residue as a solid product. The solid product that is separated may be subjected to at least one wash cycle and then repeating stages (ii) and (iii), which wash cycle comprises washing the solid product with a suitable wash liquid. The wash liquid may be water. Normally the wash water is recycled water, for instance water that has been separated from the still bottoms liquor in the distillation recovery of the fermentation product from which suspended solids have been removed.

The liquid hydrolysate, which contains sugars and acid, can then be collected for further processing.

For most fermentation processes it is preferred to adjust the pH of the acid sugar liquor to a value of at least 4. The pH adjustment may be done by addition of a base or by use of an ion exchange resin, which is capable of neutralising the acid.

In a preferred embodiment of this invention, the residual acid as well as undesirable heavy metals—if present—may be removed by increasing the pH of the sugar liquor that results from the acid digestion process to a value of at least 10 by addition of a basic material such as sodium carbonate, then separating the liquid from the solid phase including any precipitated metals that might have formed, by usual means such as filtration, and afterwards adjusting of the filtrate to a slightly acidic-pH filtrate to near neutrality. Desirably the pH may be adjusted to a value between 10 and 12, preferably about 11, by addition of a base, followed by titrating—to pH 4 to pH 5, preferably about pH 4.5.

Alternatively the acid may be removed from the liquor by adding the hydrolysate to a bed of resin beads and the sugars are adsorbed onto the resin. The resin can then be freed of the entrained liquid by flushing with a gas substantially free of oxygen. The resin can then be washed with water substantially free of oxygen to produce an aqueous sugar stream. The sugar stream desirably contains at least 98% of the sugar present in the hydrolysate.

After the separation of the acid from the sugar stream, the acid is preferably concentrated for reuse for example by evaporation.

Nutrients may be added in sufficient amounts to permit microbial growth. Typically the nutrients are selected from the group consisting of magnesium, nitrogen, potassium phosphate, trace elements and vitamins are added to the liquor following step (iv) in sufficient amounts to permit microbial growth. The sugar solution is then mixed with a microbial organism known to produce useful fermentation products.

The fermentation process of the present invention typically involves allowing the fermentation to proceed for 3 to 5 days. Volatile fermentation products may be continually removed by recirculating carbon dioxide through a cooled condensing column. Desirably the fermentation products are collected from the condensing column after three to five days and then distilled. Preferably volatile fermentation products are separated from the broth by passing the broth comprising the fermentation product into a distillation stage, where the fermentation compound is collected as a distillate and the residue 'still bottoms' is removed. Microorganisms can be separated from the fermentation broth or preferably from the still bottoms, by centrifugation and can be recycled for reuse. In one preferred aspect of the invention the fermentation product is separated from the broth by passing the broth comprising the fermentation product into a concentration stage, in which the fermentation compound is collected in the concentrate and extracted by at least one means selected from the group consisting of ion exchange, solvent extraction and electrodialysis.

The process can be used to prepare a range of fermentation products, but preferably the fermentation product is selected from the group consisting of ethanol, glycerol, acetone, n-butanol, butanediol, isopropanol, butyric acid, methane, citric acid, fumaric acid, lactic acid, propionic acid, succinic acid, itaconic acid, acetic acid, acetaldehyde, 3-hydroxy propionic acid, glyconic acid and tartaric acid and amino acids such as L-glutaric acid, L-lysine, L-aspartic acid, L-tryptophan. L-arylglycines or salts of any of these acids.

The microorganisms used in the fermentation process of the present invention can be, for example, a yeast such as *Klyveromyces* species, *Candida* species, *Pichia* species, *Brettanomyces* species, *Saccharomyces* species such as *Saccharomyces cerevisiae* and *Saccharomyces uvarum*, *Hansenula* species and *Pachysolen* species. Alternatively, the microorganism can be a bacterial species such as *Leuconostoc, Enterobacter, Klebsiella, Erwinia* sp, *Serratia, Lactobacillus, Lactococcus, Pediococcus, Clostridium, Acetobacter, Gluconobacter Lactobacillus, Aspergillus, Propionibacterium, Rhizopus* and *Zymomonas mobilis*. In addition genetically modified strains may also be used.

Since the solid product generally comprises lignin and analogous materials it can be particularly difficult to separate from the liquor. Surprisingly we have found that the production of fermentation product can be significantly improved by applying one or more particular flocculating agents to the separation of the hydrolysate from the solid product. We have found that the solid product can be more efficiently separated by the process and that a higher cake solids can be achieved. Since the solid product can be more efficiently dewatered there is a reduced requirement for separation equipment capacity, and equipment that is less capital intensive, and less expensive to operate, such as a filter press, can be used. Since higher cake solids can be achieved, less of the acid sugar solution remains in the residual by-product solid. Hence the quantity of water required to wash the by-product solid free of acid and sugar is much reduced improving both the productivity and efficiency of the process.

Employing one or more flocculants in the separation stage—according to the instant invention—results in a more efficient separation of the sugar liquor and the solid product, which in turn enables more fermentation product to be produced. In addition, more lignin can be obtained as solid mass from the inventive process compared to known processes, which can be burnt or used for the manufacture of chemicals. In general, the action of the flocculating agent greatly enhances the separation of the solids from the liquor by comparison to separation using solely mechanical means. We have found that the process of the present invention provides a higher cake solids, with less residual aqueous liquor, which means that a higher proportion of the sugar liquor is available for conversion into the fermentation product. Likewise we find that the aqueous liquor contains much lower levels of extraneous suspended cellulosic solids. Furthermore we also find that less wash water is required.

The following Examples illustrate the invention:

EXAMPLE I 100 parts softwood chips are added to 170 parts of 77% sulphuric acid and the temperature is maintained below 80° C., the resulting gelatinous mixture is thoroughly mixed. Then the gelatinous mixture is diluted with water to an acid concentration of 25%. Thereafter, the reaction mixture is heated to a temperature of 100° C. for 60 minutes. After hydrolysis, the obtained slurry is fed to separation equipment for pressing. Prior to pressing, a copolymer of 69 wt % acrylamide and 31 wt % cationic monomer (dimethylaminoethylacrylate quaternised with methyl chloride), IV approx 12 dl/g flocculent, at 0.2% solids, and a particulate suspension (sodium bentonite, at 5% solids) are added into the feed stream with necessary agitation at a dose of 0.2 kg polymer (as supplied) per tonne of solids and 0.5 kg bentonite (as supplied) per tonne solids. The acid sugar solution is separated by pressing from the remaining solids, releasing 35% acid and 17% sugar.

After pressing, the resultant cake containing the solid matter is washed with approximately an equal amount of water. Prior to re-pressing a flocculant solution as above and sodium bentonite as above are added into the feed stream with necessary agitation at a dose of 0.2 kg per ton of solids of polymer and 0.5 kg per ton solids of bentonite. Pressing released 16% acid and 9% sugar. The recovered biomass cake is then subjected to a repeat process of acid treatment (hydrolysis) above to release further sugar. The resulting cake contains more lignin compared to the content of the first cycle.

EXAMPLE II

In order to evaluate the separation of liquor from the solids a test procedure was established which will now be described with reference to the accompanying drawings in which.

Figure 1:
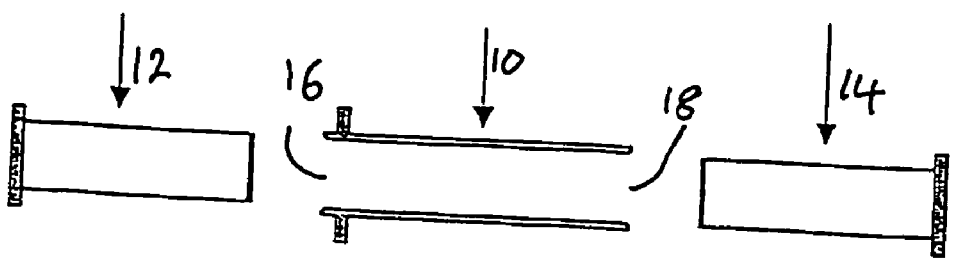
FIG. 1 is a diagrammatic axial section of a syringe.

Referring to FIG. 1 of the drawings an open ended syringe housing 10 of circular cross section is adapted to receive syringe plungers 12 and 14 into each open end 16 and 18 respectively.

Figure 2:
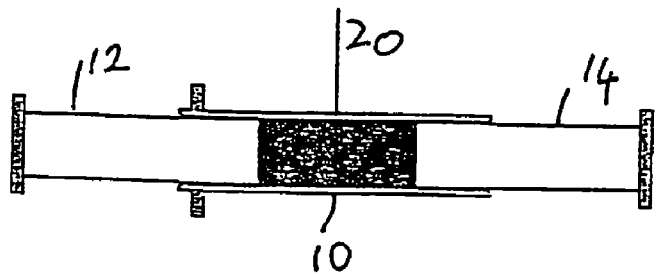
FIG. 2 shows the syringe of FIG. 1 containing a sample to be tested.

As shown in FIG. 2 a sample 20 of hydrolysate to be tested is disposed in the syringe substantially in the mid part thereof and held in place by the plungers 12 and 14. Air bubbles are excluded by tipping the syringe. The syringe together with the sample is heated at a preset temperature, for example 80° C. for a predetermined time usually about 15 minutes.

Figure 3:
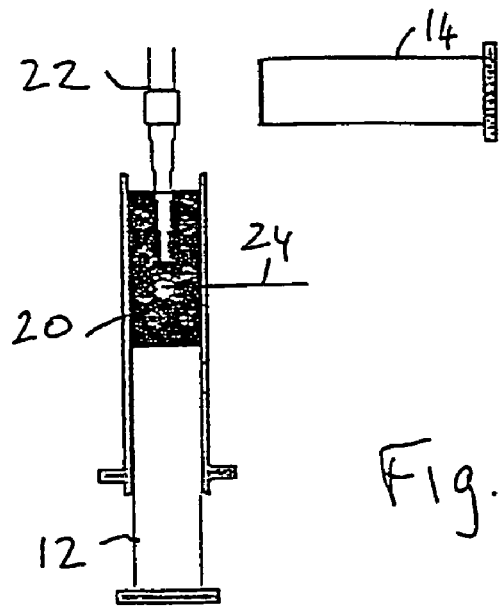
FIG. 3 illustrates the introduction of flocculant into the sample.

After heating one plunger is removed as shown in FIG. 3 and a polymer flocculant 24 is introduced into the sample by a pipette 22. If necessary the polymer can be stirred into the sample with the pipette. Thereafter the separated plunger is replaced and the syringe is shaken to ensure that the polymer is distributed throughout the sample. The syringe is then heated at a preset temperature, for example 80° C. for a further predetermined time which may be about 10 minutes.

Figure 4:
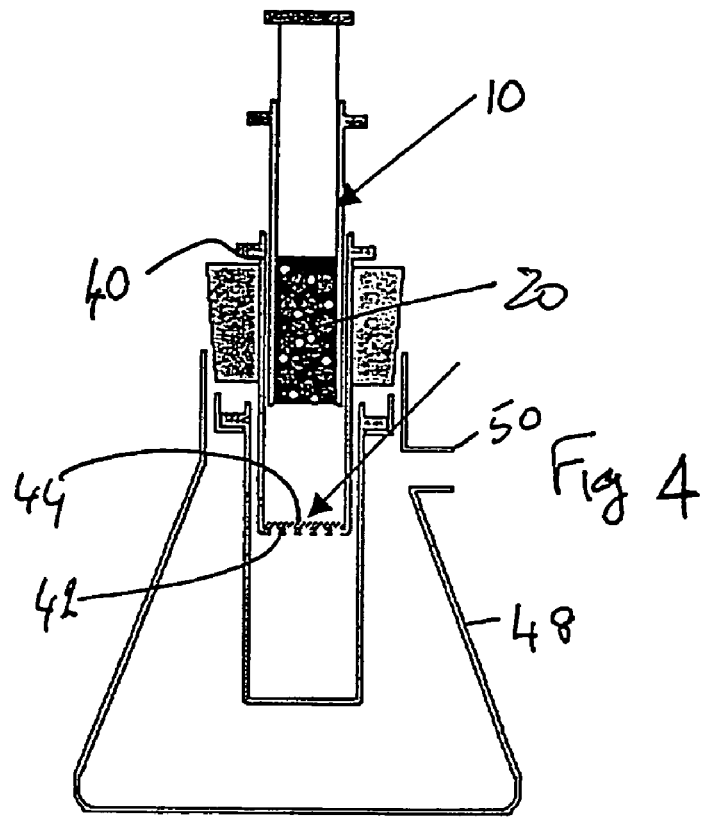
FIGS. 4 and 5 show equipment used in the instant procedure.
Figure 5:
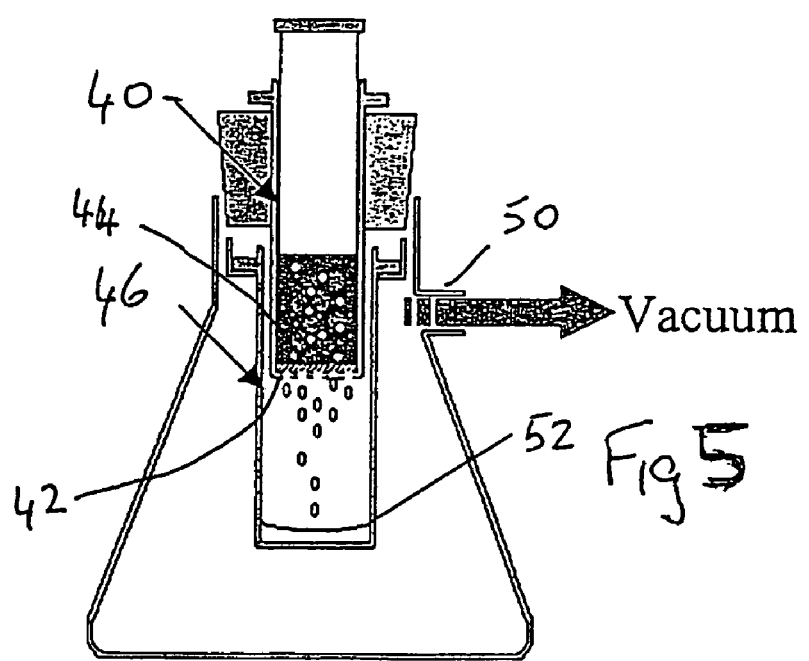

Following the procedure described with reference to FIGS. 1 to 3 after the second incubation at 80° C. one of the plungers is removed from the syringe and as shown in FIGS. 4 and 5 the open end of the syringe inserted into the open top of a larger syringe 40 having a perforated base 42 for supporting a mesh 44. A receiving cylinder 46 is positioned around the lower end of syringe 40 and the assembly of syringe 40 and cylinder 46 is mounted in flask 48 having a connection 50 to a vacuum. The sample is washed with water and the filtrate 52 collecting in the receiving cylinder can be examined.

The equipment with reference to FIGS. 4 and 5 was used to examine the separation of acid and sugar from a sample of hydrolysate treated in accordance with the invention.

Figure 6:
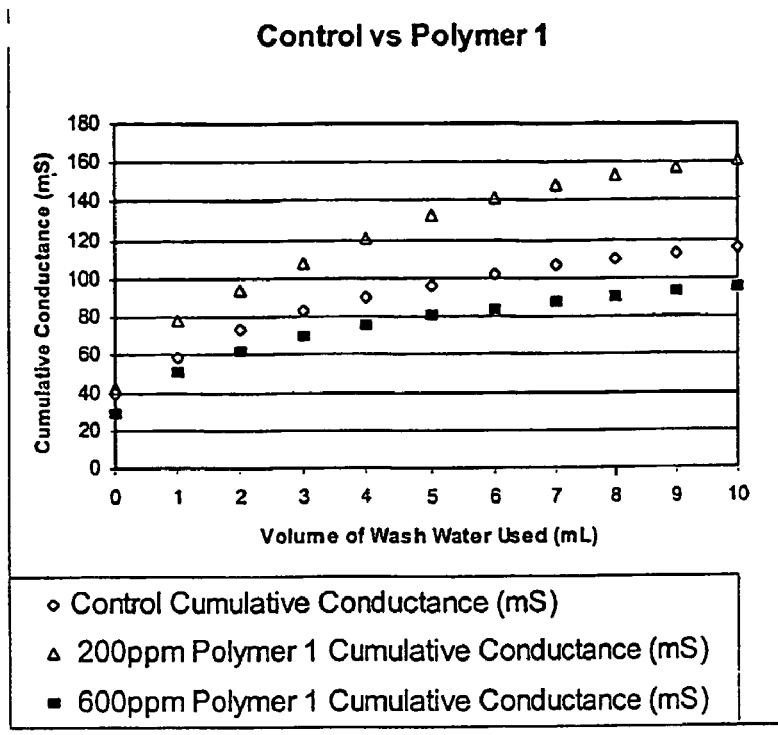
FIGS. 6 and 7 show graphs of results produced by the instant procedure.

A 5 g sample of hydrolysate derived from corn stover was placed in the syringe housing 10 together with some ball bearings and held in place with the plungers during incubation. 0.1 ml of a 1% solution of Polymer 1 was introduced into the sample by a pipette as illustrated in FIG. 2. After the second incubation the sample and flocculant was transferred from syringe housing 10 to syringe 40, a 58 micron mesh having been provided on the perforated base 42. 10 ml of wash water was delivered to the syringe 40 while the vacuum was applied. The conductance of the filtrate was measured for each 1 ml of liquid recovered and the cumulative conductance results are shown on the graph of FIG. 6 which also shows the results obtained for a control sample. As can be seen the inclusion of the flocculant caused a rapid increase in the cumulative conductance on the addition of the wash water which indicates that acid is being removed with the wash water.

Figure 7:
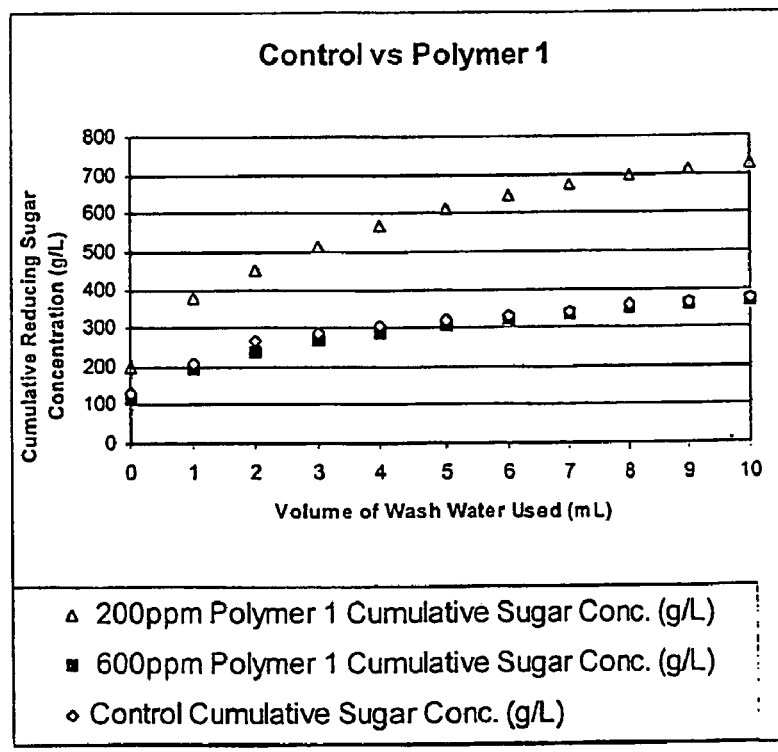

FIG. 7 shows the cumulative amount of sugar determined in the filtrate following the addition of wash water.

Polymer 1 is an acrylamide homopolymer with an IV of approx 15 dl/g.

The invention claimed is:

1. A process of producing fermentation product comprising the steps of,
   (i) hydrolysing a particulate polysaccharide based plant derived material in an acid medium using an acid having a pKa below 4 in a concentration of at least 10% by weight, and thereby forming an acidic aqueous mixture comprising dissolved sugar and solid matter,
   (ii) subjecting the acidic aqueous mixture to one or more separation stages in which solid matter are removed from the acidic aqueous mixture to obtain an aqueous phase,
   (iii) adjusting the pH of the obtained aqueous phase to a pH of at least 4,
   (iv) fermenting the dissolved sugars of the aqueous phase by a microorganism to produce a fermentation product,
   (v) isolating the fermentation product,
   characterised in that in at least one separation stage in step (ii) a flocculating agent is added to the acidic aqueous mixture in an effective amount to flocculate the solid matter and the flocculating agent is selected from the group consisting of water soluble polymers, water-swellable polymers, and charged microparticulate material and the separation stage includes mechanical means selected from the group consisting of a filter press, centrifuge, belt press, horizontal belt filter, and pressure filter, to separated the solid matter as cake solids.

2. A process according to claim 1 in which the plant derived material comprises components selected from the group consisting of herbaceous biomass, softwood biomass, hardwood biomass, sewage sludge, paper mill sludge and the biomass fraction of municipal solid waste.

3. A process according to claim 1 in which the solid matter are subjected to at least one wash cycle, which wash cycle comprises washing the solid matter and then repeating stages (i) and (ii).

4. A process according to claim 1 in which the flocculating agent is selected from the group consisting of water-soluble or water swellable natural, semi-natural and synthetic polymers.

5. A process according to claim 4 in which the polymer is selected from the group consisting of polyacrylate salts, polyacrylamide, copolymers of acrylamide with (meth) acrylic acid or salts thereof, copolymers derived from acrylamide and dialkylaminoalkyl (meth)acrylate acid salt or quaternary ammonium salts, polymers derived from diallyldimethyl ammonium chloride, polyamines and polyethylene imines.

6. A process according to claim 1 in which the flocculating agent is a charged microparticulate material.

7. A process according to claim 6 in which the charged microparticulate material is selected from the group consisting of swellable clays, anionic, cationic or amphoteric microparticulate silica based materials and organic cross-linked polymeric microparticles.

8. A process according to claim 1 in which the flocculating agent is a water soluble or water-swellable polymer and a charged microparticulate material.

9. A process according to claim 1 in which the acid having a pKa below 4 is sulphuric or hydrochloric acid.

10. The process according to claim 1, wherein the amount of flocculating agent is in the range of from 0.002 to 1% by weight, based on the weight of solid matter.

\* \* \* \* \*

UNITED STATES PATENT AND TRADEMARK OFFICE
CERTIFICATE OF CORRECTION

PATENT NO.        : 7,582,444 B2                                      Page 1 of 1
APPLICATION NO.   : 10/523229
DATED             : September 1, 2009
INVENTOR(S)       : Jonathan Hughes It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 916 days.

Signed and Sealed this

Fourteenth Day of September, 2010

David J. Kappos
*Director of the United States Patent and Trademark Office*